(12) United States Patent
Chen

(10) Patent No.: US 12,059,101 B2
(45) Date of Patent: Aug. 13, 2024

(54) REINFORCED FOLDING CUTTING MAT

(71) Applicant: Chi-Jen Chen, Xihu Township, Changhua County (TW)

(72) Inventor: Chi-Jen Chen, Xihu Township, Changhua County (TW)

( * ) Notice: Subject to any disclaimer, the term of this patent is extended or adjusted under 35 U.S.C. 154(b) by 495 days.

(21) Appl. No.: 17/362,024

(22) Filed: Jun. 29, 2021

(65) Prior Publication Data

US 2023/0001600 A1    Jan. 5, 2023

(51) Int. Cl.
*A47J 47/00* (2006.01)
(52) U.S. Cl.
CPC .................................. *A47J 47/005* (2013.01)
(58) Field of Classification Search
CPC ...................................................... A47J 47/005
USPC ......................................... 269/311, 901, 902
See application file for complete search history.

(56) References Cited

U.S. PATENT DOCUMENTS

| 11,077,575 | B1 * | 8/2021 | Carnegie | ................. | B32B 33/00 |
| 2007/0193049 | A1 * | 8/2007 | Vetromila | ................ | G01B 3/04 |
| | | | | | 33/436 |

FOREIGN PATENT DOCUMENTS

| CN | 102406466 A | * | 4/2012 | | |
| DE | 202012101979 U1 | * | 12/2012 | ............ | A47J 47/005 |

OTHER PUBLICATIONS

CN-102406466-A translation (Year: 2012).*
DE-202012101979-U1 translation (Year: 2012).*

* cited by examiner

*Primary Examiner* — Abbie E Quann
(74) *Attorney, Agent, or Firm* — Egbert, McDaniel & Swartz, PLLC

(57) ABSTRACT

A reinforced folding cutting mat including a mat, which is a plate body thicker than 0.5 mm. The mat is formed with at least a cutting face made of cutting resistant plastic material. At least a fold tangent is formed in at least one part of mat, so that the mat can be bent using the fold tangent as fold line, and the one fold tangent includes a plurality of deep cutting edges and a plurality of reinforcing ribs with different cutting depths. The reinforcing ribs are adjacent to the deep cutting edges. The folding cutting mat is a product a one-piece product that is reinforced and has a more durable fold tangent form.

2 Claims, 9 Drawing Sheets

REINFORCED FOLDING CUTTING MAT

CROSS-REFERENCE TO RELATED U.S. APPLICATIONS

Not applicable.

BACKGROUND OF THE INVENTION

1. Field of the Invention

The present invention relates generally to a cutting mat, and more particularly to an innovative folding cutting mat form with a reinforced structure which is better for repetitive folding action.

2. Description of Related Art Including Information Disclosed Under 37 CFR 1.97 and 37 CFR 1.98

The traditional cutting mat product type is well known by relevant users, which is generally a plate body made of cutting resistant material. In order to enlarge the cutting area and give attention to the portability of cutting mat, related suppliers have put a folding cutting mat on the market. The folding structure thereof is made by attaching a flexible soft sheet between the abutting sides of two cutting plates, thus, the two cutting plates can fold using the soft sheet as a flexible part.

However, said folding cutting mat structure type still has some problems in practical application. For example, as the soft sheet must adhere between two cutting plates, the costs of material and process will increase a lot, and the soft sheet corners are likely to peel off or warp during operation, leading to poor durability.

On the other hand, if related circles try to develop the folding cutting mat into a multi-directionally extensible type with other added values and functions, said structure type which achieves the folding function by attaching a soft sheet is inapplicable as the aesthetic property and cutting area are likely to be influenced.

Therefore, for said problems in the known cutting mat structure, how to develop an innovative structure with more ideal practicability is anxiously expected by users, as well as the goal and direction of research and development of related suppliers.

BRIEF SUMMARY OF THE INVENTION

The primary objective of the present invention is to provide a reinforced folding cutting mat. The technical problem to be solved is to break through how to develop a novel cutting mat structure type with more ideal practicability.

Based on said objective, the present invention provides a folding cutting mat, including a mat, which is a plate body thicker than 0.5 mm. The mat is formed with at least a cutting face. The cutting face is made of cutting resistant plastic material, and the mat has a rectangular contour. At least a fold tangent is formed in at least one part of mat, so that the mat can be bent using the fold tangent as fold line, and one fold tangent includes a plurality of deep cutting edges and a plurality of reinforcing ribs with different cutting depths. The reinforcing ribs are adjacent to the deep cutting edges.

Based on the innovative structure type and technical characteristic, in comparison to prior art, the present invention provides the folding cutting mat product with a one-piece cutting formed, structure reinforced and more durable fold tangent type through the morphological feature formed by the deep cutting edges and reinforcing ribs with difference cutting depths, and the material and manufacturing costs are reduced a lot, resulting in practical progressiveness and better industrial and economic benefit.

Another objective of the present invention is another technical characteristic when there is a plurality of fold tangents, the fold tangents adjacent to each other are formed on different surfaces of mat, so that the mat can be operated in Z-shaped folded state to achieve convenient folding and extension, as well as the advantage and practical progressiveness in stack storage and transportation of the end products or semi-finished products of folding cutting mat.

DETAILED DESCRIPTION OF THE INVENTION

Figure 1:
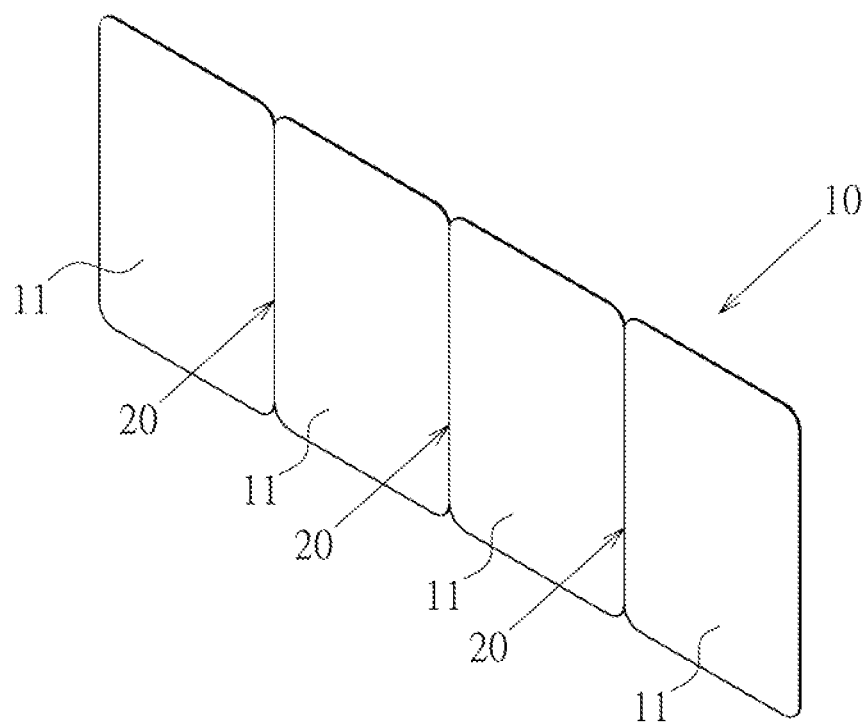
FIG. 1 is a stereogram of the preferred embodiment of the folding cutting mat of the present invention.
Figure 2:
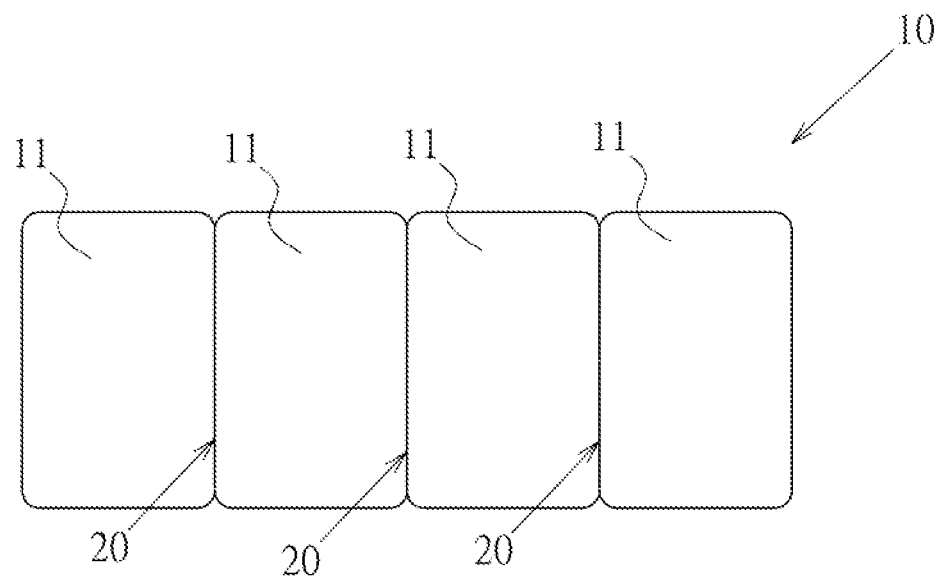
FIG. 2 is a front view of the preferred embodiment of the folding cutting mat of the present invention.
Figure 3:
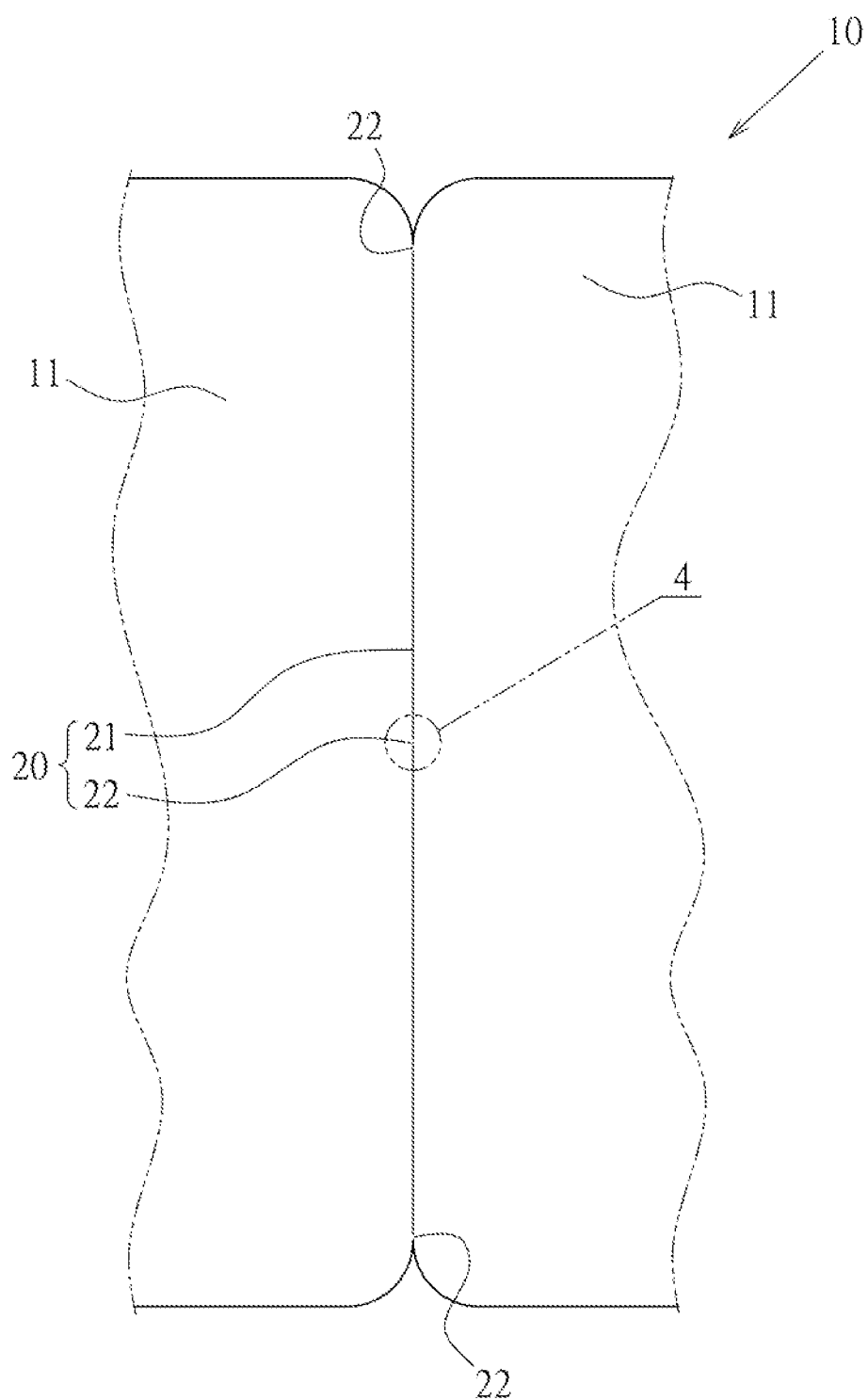
FIG. 3 is a close-up front view of the preferred embodiment of the folding cutting mat of the present invention.
Figure 4:
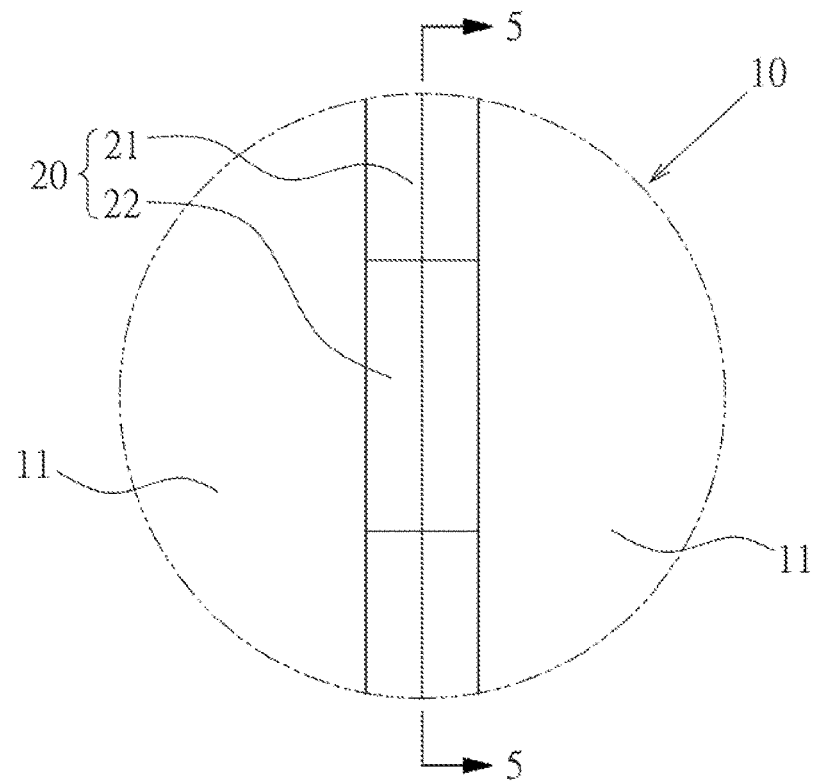
FIG. 4 is an enlarged view of Mark 4 in FIG. 3.

FIG. 1 to FIG. 6 show the preferred embodiments of the reinforced folding cutting mat of the present invention, but the embodiments are for illustration only, the patent application is not limited to this structure.

The folding cutting mat comprises a mat 10, which is a plate body thicker than 0.5 mm. The mat 10 is formed with at least a cutting face 11 (note: both sides of the mat 10 in this case are cutting faces). The cutting face 11 is made of cutting resistant plastic material (e.g. soft PVC, TPR, etc.), and the mat 10 has a rectangular contour (note: including the shapes with bevels or fillets at corners of rectangle). At least a fold tangent 20 is formed in at least one part of the mat 10, so that the mat 10 can be bent using the at least one fold tangent 20 as fold line. Wherein one fold tangent 20 includes a plurality of deep cutting edges 21 and a plurality of reinforcing ribs 22 with different cutting depths. The reinforcing ribs 22 and the deep cutting edges 21 are adjacent to each other.

Figure 6:
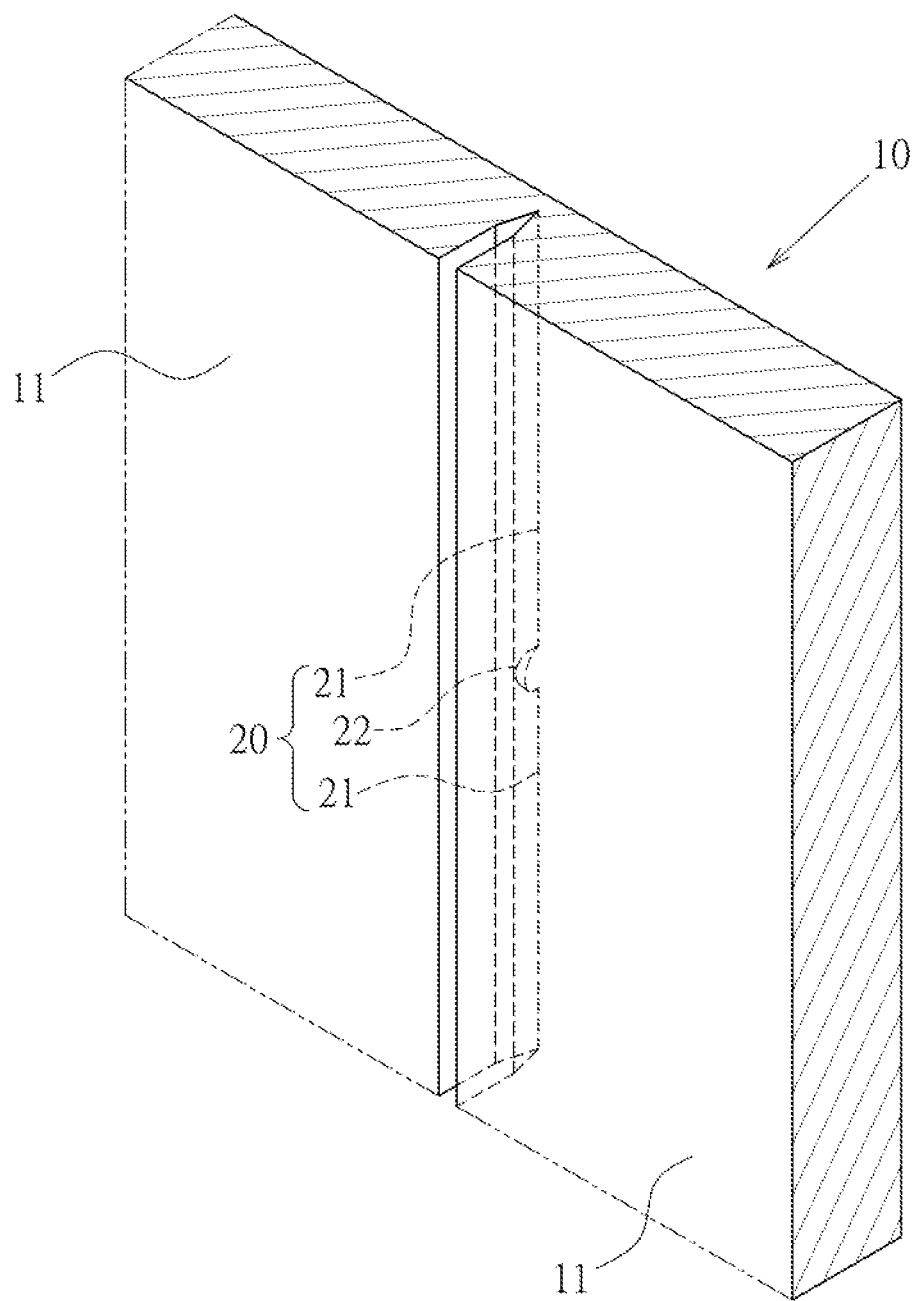
FIG. 6 is a three-dimensional diagram of Mark 4 region in FIG. 3.

According to the above description, said fold tangent 20 is a groove formed by cutting one side towards the other side of the mat 10 (as shown in FIG. 6). This part is distinct from the intermittently punched pre-fold line (or pre-broken line) form of the known thin-shell objects, and the readers shall be acquainted with this difference.

Figure 5:
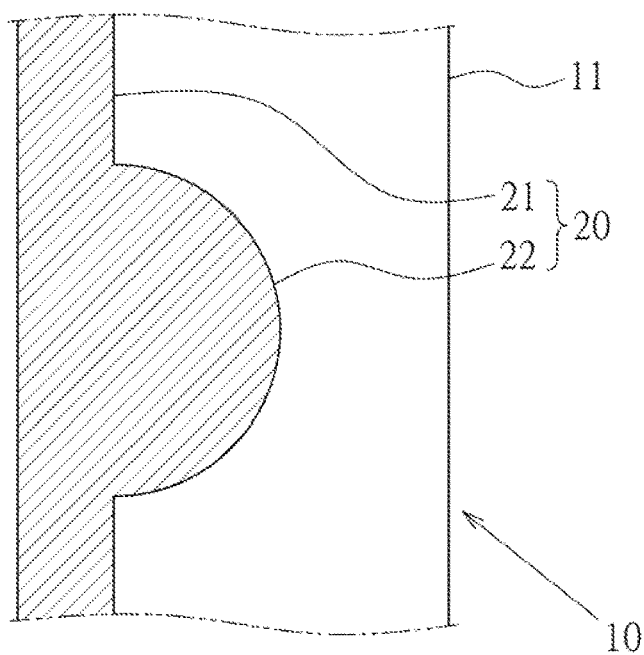
FIG. 5 is the 5-5 sectional view of FIG. 4.

As shown in FIG. 5 and FIG. 6, in this case, the mat 10 is a single-layer structure composed of one material. (e.g. the overall structure of the mat 10 composed of such single materials as soft PVC, TPR, etc.).

Figure 7:
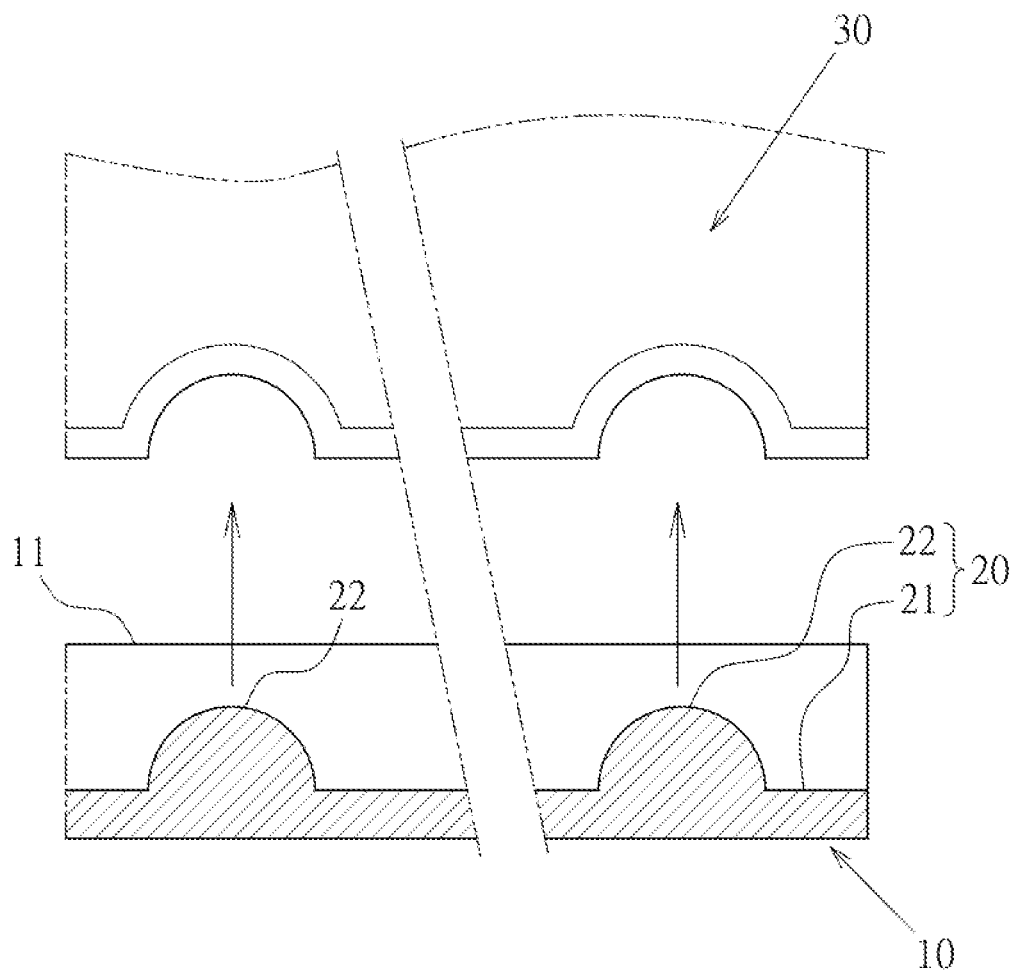
FIG. 7 is a schematic diagram of cutting forming of fold tangent of the present invention.
Figure 8:
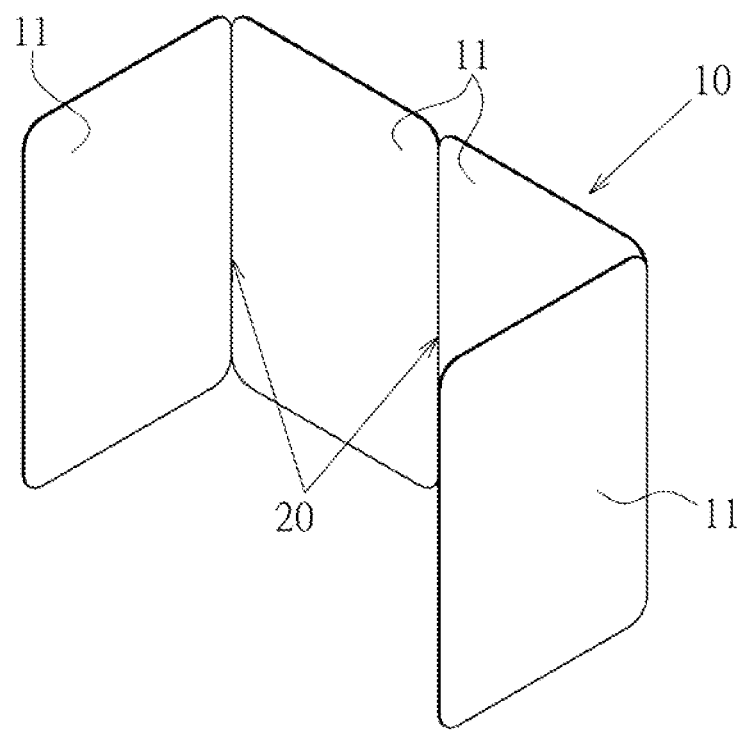
FIG. 8 shows an Embodiment 1 of the folding cutting mat of the present invention bent into a curtain.
Figure 9:
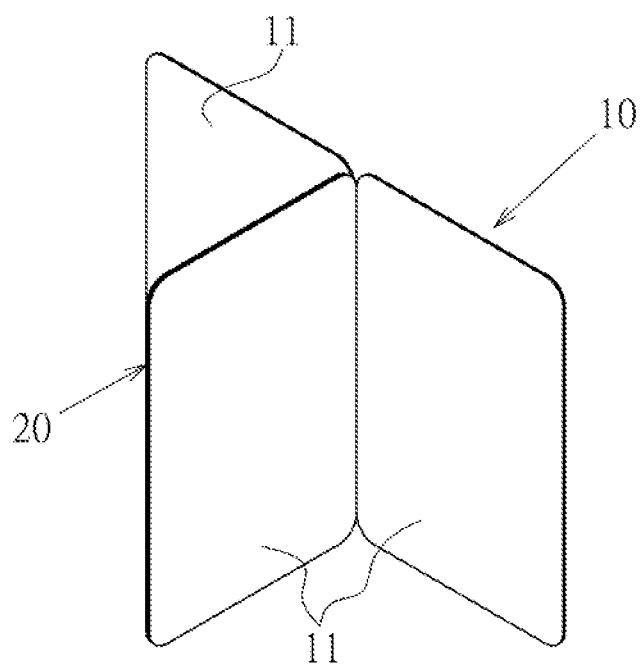
FIG. 9 shows an Embodiment 2 of the folding cutting mat of the present invention bent into a curtain.

Based on said structural composition and technical characteristic, the folding cutting mat disclosed in the present invention in practical application is shown in FIG. 7, the fold tangent 20 can be rapidly formed by cutting die 30, so as to form deep cutting edges 21 and reinforcing ribs 22 with different cutting depths, thus it can be seen that in comparison to the known technology, the present invention can increase the process efficiency greatly and reduce the cost significantly. With the distribution number and form planning of said fold tangent 20, the folding cutting mat of the present invention can be bent into a ⊓-shaped curtain form as required (as shown in FIG. 8), or bent into a T-shaped curtain form (as shown in FIG. 9), or bent into other feasible curtain forms, so as to exercise the other practical added values of the folding cutting mat product, such as epidemic prevention curtain in large demand at present, so as to meet the consumers' multiple requirements, and the operation and storage of the folding cutting mat are quite simple and saving space. Moreover, the fold tangent 20 of the present invention forms a particular morphological feature of shallower reinforcing rib 22 at the abutting joint of deep cutting edge 21, so as to form reinforcing connecting rib structures spaced apart in the groove type fold tangent 20, when the groove section of fold tangent 20 is open as the mat 10 is bent, said reinforcing rib 22 is stretched to reinforce connection, so as to effectively prevent the fold tangents 20 of mat 10 from breaking due to repeated folding, the durability is enhanced, and the service life of folding cutting mat product is prolonged greatly. When the groove section of fold tangent 20 is restored to the original state, the reinforcing rib 22 is restored to the original state as the plastic material of mat 10 is elastic.

Figure 10:
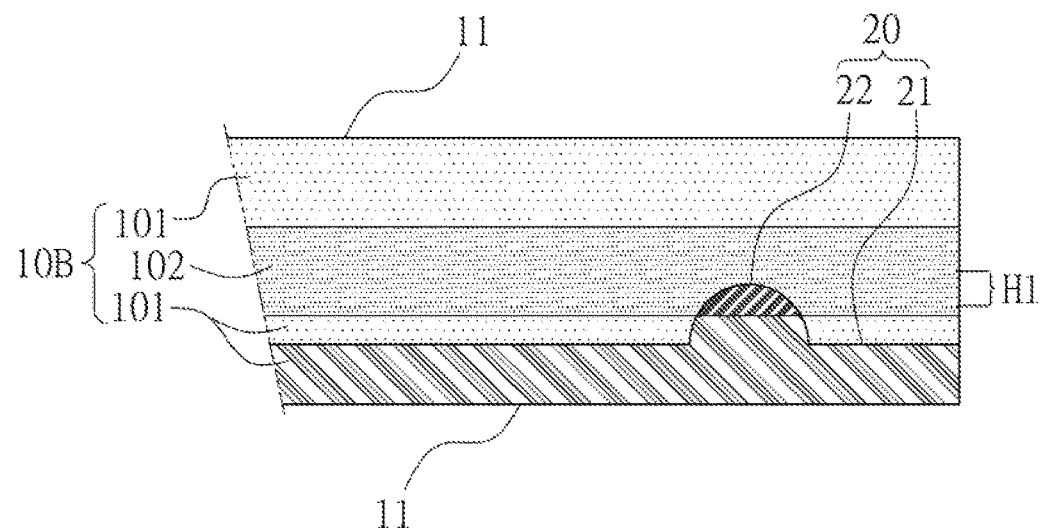
FIG. 10 is a sectional view of local structure of composite embodiment of the mat.

As shown in FIG. 10, in this case, the mat 10B is a composite layer structure type composed of a plurality of dissimilar materials, including two first material layers 101 for forming two cutting faces 11 (e.g. soft PVC and TPR), and a second material layer 102 sandwiched in between the two first material layers 101 (e.g. PP), wherein the hardness of the second material layer 102 is higher than the hardness of the first material layer 101.

As shown in FIG. 10, in this case, the cutting depth of the reinforcing ribs 22 is 1/10 to 1/2 of the thickness of the second material layer 102 (see H1 in FIG. 10), this is the preferred cutting depth range.

Figure 11:
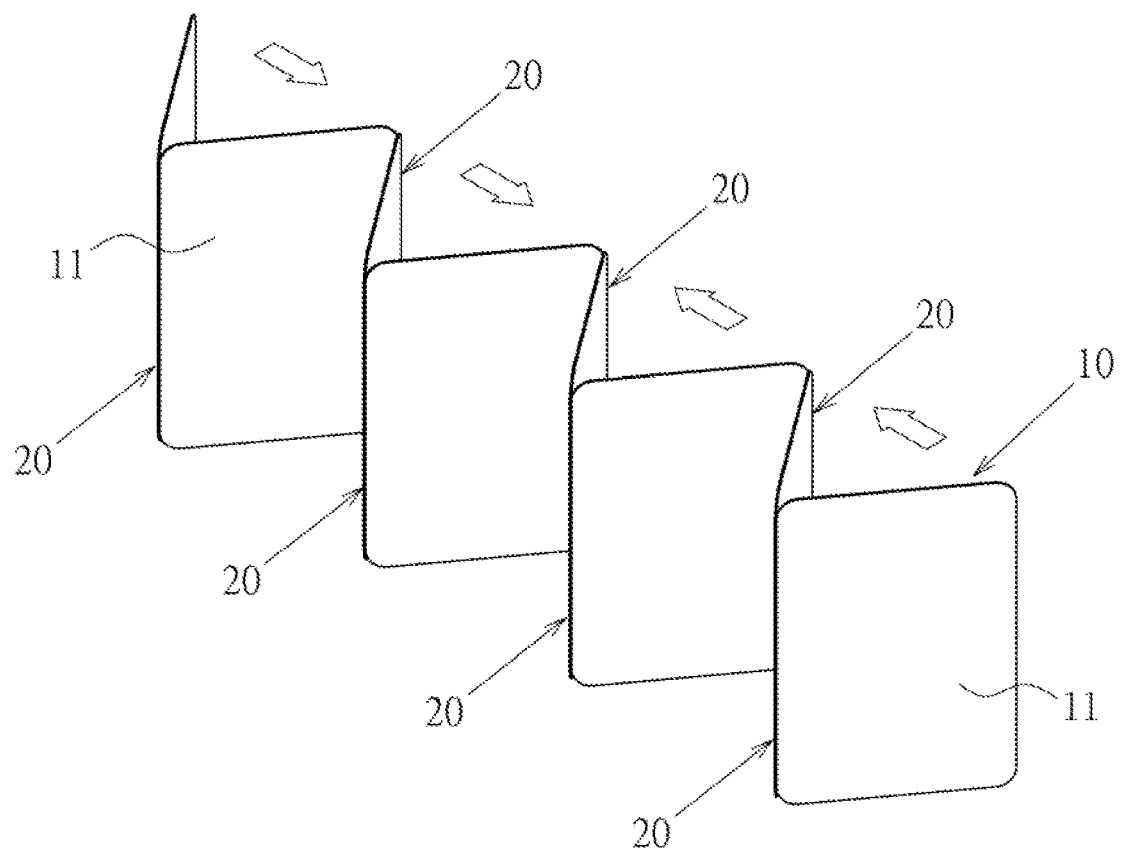
FIG. 11 shows an embodiment of the mat in a Z-shaped folded state.

As shown in FIG. 11, in this case, when there is a plurality of fold tangents 20, the fold tangents 20 adjacent to each other are formed on different surfaces of the mat 10, so that the mat 10 can be operated in Z-shaped folded state. The benefit of this embodiment is that the production circle can fold and stack a coil of very long material in Z shape through stamping and cutting forming operation of mat 10 contour and fold tangent 20, when the material is sent to the end product assembling and packing unit, the predetermined fold tangent 20 is cut off to form the final folding cutting mat product type, so as to implement more convenient stack storage and transportation of the end products or semi-finished products of folding cutting mat, reduce the cost and storage space.

Figure 12:
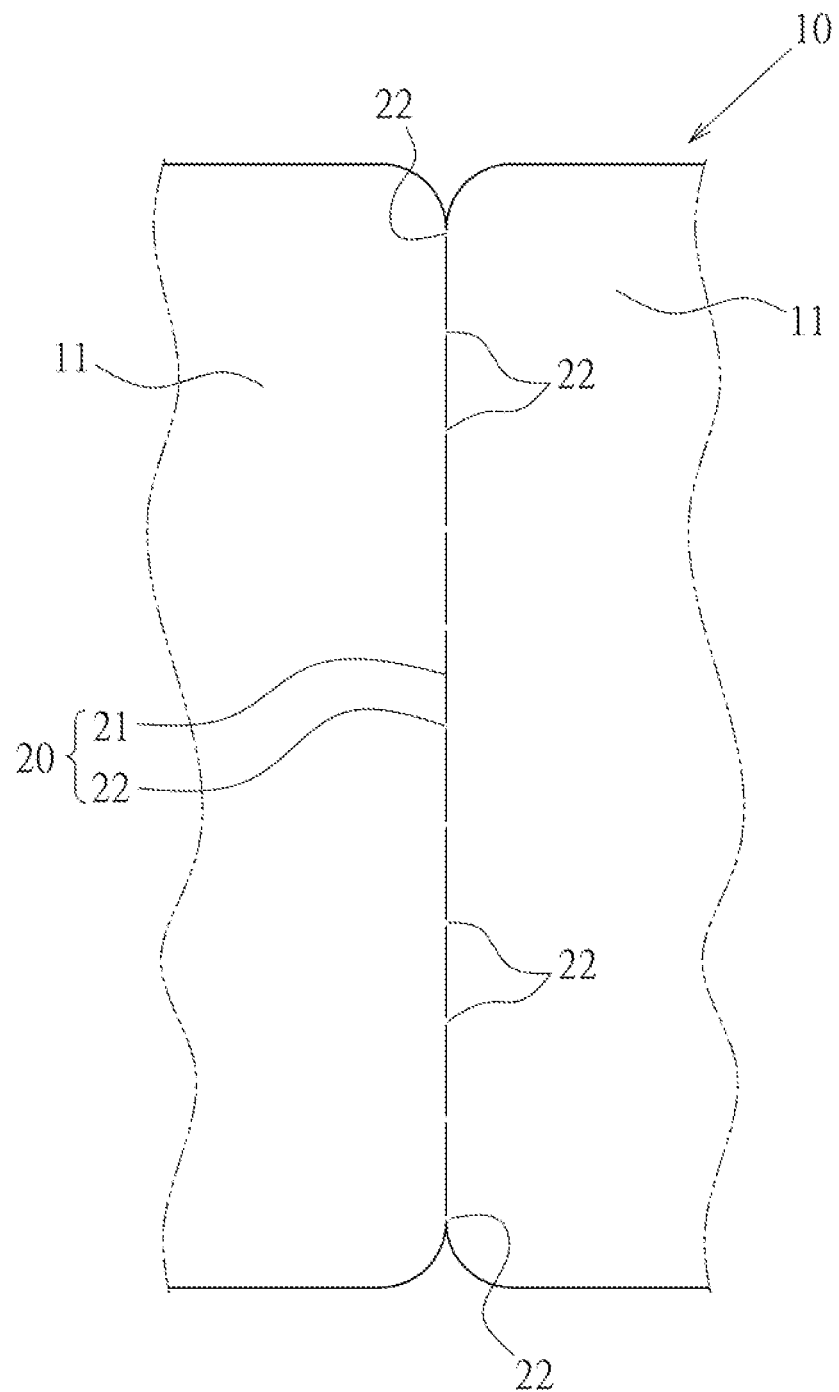
FIG. 12 shows another embodiment of the reinforcing rib configuration of fold tangent of the present invention.

As shown in FIG. 12, the fold tangent 20 disclosed in this case has a configuration of very dense reinforcing ribs 22, so as to achieve better strength and durability.

Figure 13:
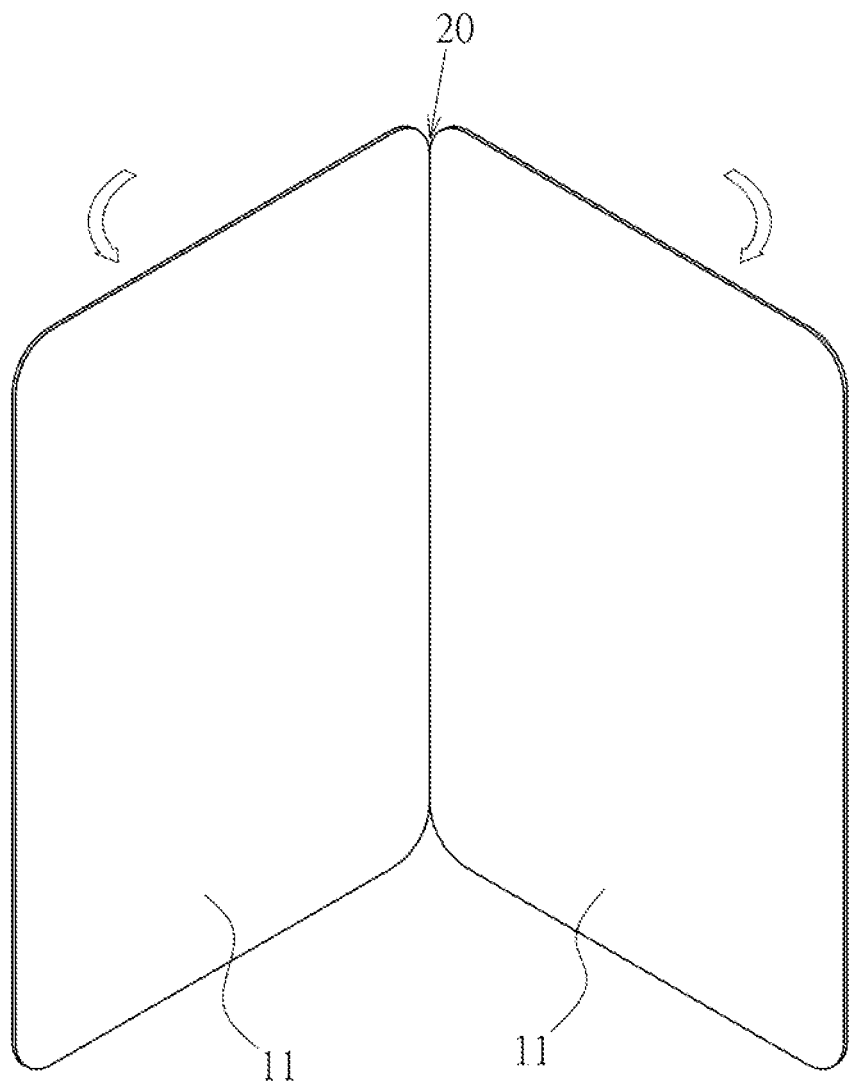
FIG. 13 shows an embodiment of bifacially folding configuration of the mat.

As shown in FIG. 13, the mat 10 disclosed in this case is bifacially folding type, this is one of specific embodiments of the present invention.

I claim:

1. An article comprising:
   a mat having a plate body shape with a thickness of greater than 0.5 millimeters, said mat having a pair of ending faces, the pair of cutting faces being of a cutting resistant plastic material, said mat having a rectangular contour;
   at least one fold tangent formed in at least one portion of said mat, said at least one fold tangent adapted to allow said mat to be bent therealong, said at least one fold tangent being a fold line, said at least one fold tangent having a plurality of deep cutting edges and a plurality of reinforcing ribs, the plurality of reinforcing ribs having different cutting depths, the plurality of reinforcing ribs being respectively adjacent the plurality of deep ending edges, wherein said mat has a composite layer structure formed of a plurality of dissimilar materials, said mat having a pair of first material layers forming the pair of cutting faces, said mat having a second material layer sandwiched between the pair of first material layers, the second material layer having a hardness greater than a hardness of each of the pair of first material layers, wherein each of the different cutting depths of the plurality of reinforcing ribs is between one-tenth and one-half of a thickness of the second material layer.

2. The article of claim 1, wherein said at least one fold tangent comprises a plurality of fold tangents, adjacent fold tangents of the plurality of fold tangent being formed on different surfaces of said mat so as to allow said mat to be folded in a Z-shape.

* * * * *